Oct. 1, 1935.                    W. C. McWHIRTER                    2,016,154
                                 RESILIENT COUPLING
                                 Filed June 14, 1934
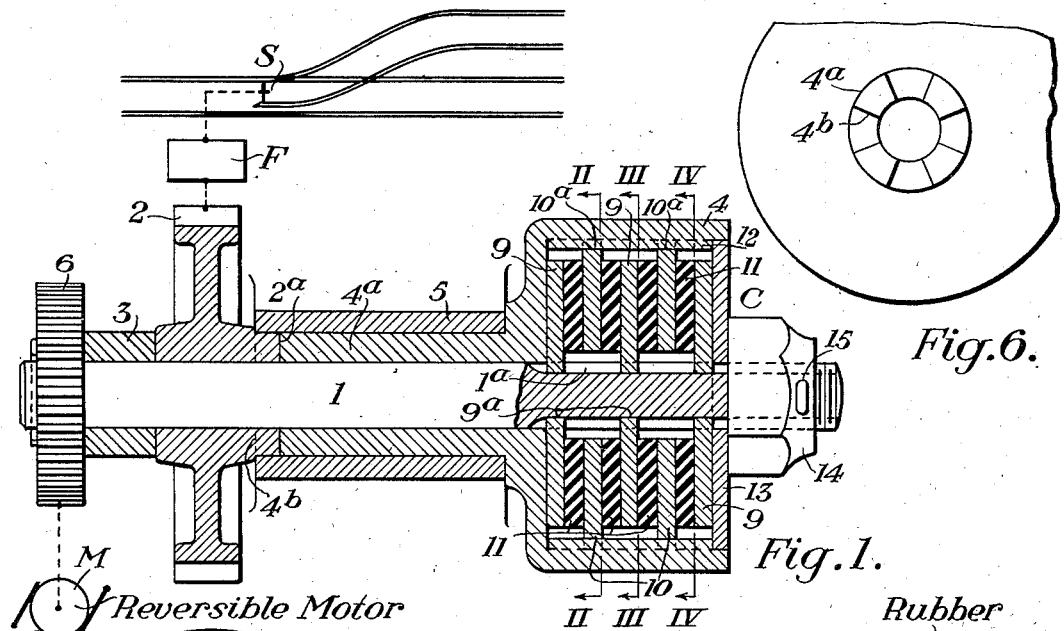
Fig.6.
Fig.1.
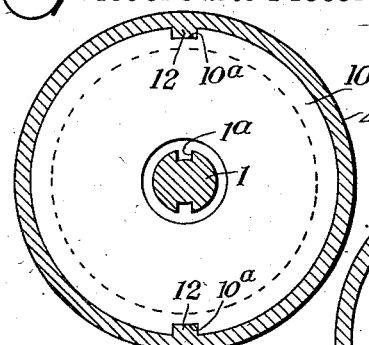
Fig.2.
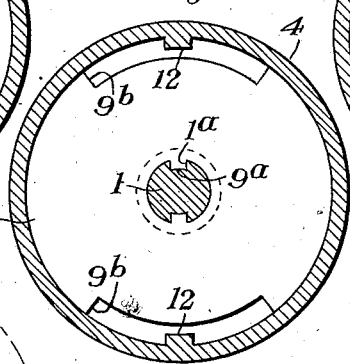
Fig.3.
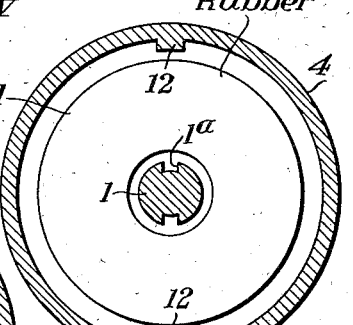
Fig.4.
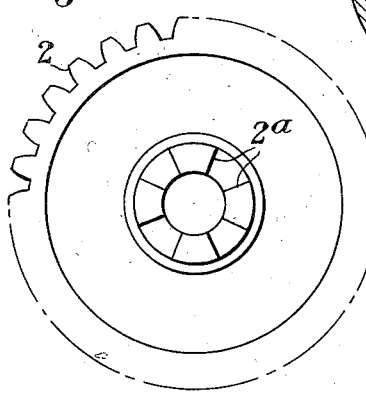
Fig.7.
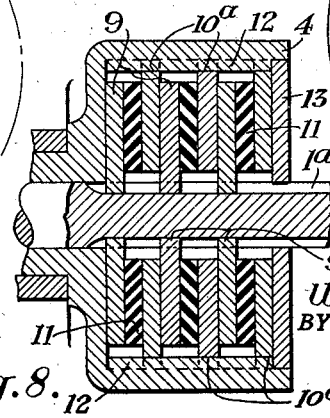
Fig.5.
Fig.8.
INVENTOR
William C. McWhirter.
BY
HIS ATTORNEY Patented Oct. 1, 1935

2,016,154

UNITED STATES PATENT OFFICE 2,016,154

RESILIENT COUPLING

William C. McWhirter, Wilkinsburg, Pa., assignor to The Union Switch & Signal Company, Swissvale, Pa., a corporation of Pennsylvania Application June 14, 1934, Serial No. 730,631

2 Claims. (Cl. 64—100)

My invention relates to resilient couplings, and particularly to couplings for use between a driving member and a driven member in mechanisms which are subject to starting or stopping shocks.

One object of my invention is to provide an inexpensive coupling of the type described which will provide a positive drive action within the range of torque required but which will yield a limited amount when the mechanism is subjected to a shock, without any danger of continuous slipping.

I will describe two forms of couplings embodying my invention, and will then point out the novel features thereof in claims.

In the accompanying drawing, Fig. 1 is a view partly sectioned and partly diagrammatic, showing one form of coupling embodying my invention applied to apparatus for operating a railway switch. Figs. 2, 3, and 4 are sectional views taken on the lines II—II, III—III, and IV—IV, respectively, of Fig. 1. Fig. 5 is a right-hand end view, and Fig. 6 is a left-hand end view of the coupling device C shown in Fig. 1. Fig. 7 is a left-hand side view of the gear wheel 2 shown in Fig. 1. Fig. 8 is a sectional view showing a modified form of the coupling device illustrated in Fig. 1.

Similar reference characters refer to similar parts in each of the several views.

Referring first to Figs. 1 to 6, inclusive, the reference character 1 designates a rotatable shaft which may be driven by any suitable power device, and which, in turn, drives a gear wheel 2 through a coupling device C embodying my invention, in a manner which will be made clear hereinafter. The shaft 1 is journaled adjacent its left-hand end in a bearing 3, and, as here shown, is arranged to be driven by a reversible electric motor M which is connected with the shaft by suitable gearing including a gear wheel 6 fixed to the shaft.

The coupling device C, in the form here illustrated, comprises a suitable cylindrical housing 4 provided at its left-hand end with an integral hub 4ª. The hub 4ª is mounted for rotation about the shaft 1 within a bearing 5, and is operatively connected, at its left-hand end, with the gear wheel 2 by means of integral projections 4ᵇ (see Fig. 6) which mesh with similar projections 2ª (see Fig. 7) formed on the hub of the gear wheel 2. The gear wheel 2 is journaled on the shaft 1 between the two bearings 3 and 5, and it will be seen, therefore, that any rotation of the housing 4 will cause corresponding rotation of the gear wheel 2, and vice versa.

Mounted within the housing 4 are a plurality of metal discs 9, a plurality of metal discs 10, and a plurality of rubber discs 11, so disposed that one of the discs 9 is located on each side of each disc 10, and that a disc 11 is located between each disc 9 and the adjacent disc 10. Each rubber disc 11 is securely fastened to the two contiguous discs 9 and 10 in any suitable manner as by vulcanizing, and each disc 9 is operatively connected with the shaft 1 by means of keys 9ª (see Fig. 3) which extend, with substantially no clearance into keyways 1ª provided in the shaft 1, while each disc 10 is operatively connected with housing 4 by means of peripheral notches 10ª (see Fig. 2) which receive, with substantially no clearance, longitudinal ribs 12 provided on the inside of the housing 4. It will be seen, therefore, that any torque which is exerted on the shaft 1 will be transmitted through the discs 9, 10, and 11 to the housing 4, and hence to the gear wheel 2, and vice versa; and that since the discs 11 are rubber and are capable of yielding, if the torque which is transmitted by these discs exceeds a certain magnitude which depends upon the number of these discs and upon the characteristics of the rubber of which they are constructed, these discs will yield or twist an amount which, within the limits of elasticity of the rubber, depends upon the amount of the excess torque. It will also be seen that any twisting of the discs 11 will cause relative rotation between the discs 9 and 10, and hence between the shaft 1 and the gear wheel 2, and it follows that by properly proportioning the parts, the coupling device C may be made to cushion any load which is connected with the gear wheel 2 against shocks due to the stopping or starting of the motor M, and to cushion the motor against shocks due to sudden increases in the load, etc.

In order to prevent damage to the coupling device due to excess twisting of the discs 11 and to insure a positive driving action under all conditions without unnecessarily decreasing the cushioning action of the coupling device, the discs 9 are further provided with arcuate peripheral recesses 9ᵇ which cooperate with the ribs 12. The lengths of these recesses are such and the parts are so proportioned that when no twisting of the discs 11 exists, the ribs 12 will occupy the central portions of the recesses, but that, when the discs have been twisted the maximum amount which it is desired to permit, the ribs 12 will then engage the discs 9 at one end or the other of the recesses 9ᵇ, depending upon the direction of rotation of the shaft 1 at the time the twisting occurs.

The discs 9, 10 and 11 are held in place in the housing 4 by a metal plate 13 which fits inside of the open end of the housing, and a nut 14 which is screwed onto the threaded right-hand end of the shaft 1. The nut 14 is prevented from working loose by a cotter pin 15 in the usual and well-known manner.

The gear wheel 2 may be connected with any desired load through any suitable connecting means. As here shown, the gear wheel 2 is connected with a railway switch S through the medium of a switch operating mechanism indicated diagrammatically in the drawing at F. The detail construction of the mechanism F is not shown in the drawing because it forms no part of my present invention. This mechanism may, however, be similar to that shown in Letters Patent of the United States No. 1,293,290, granted to William Zabel on February 4, 1919, for Railway traffic controlling apparatus, in which event the gear wheel 2 will be operatively connected with the shaft 40 of the operating mechanism in such manner that rotation of the gear wheel 2 will cause corresponding rotation of the shaft 40.

As was previously pointed out, the motor M is a reversible motor, and this motor may be controlled in any suitable manner forming no part of my present invention, and therefore not shown in the drawing.

The operation of the apparatus as a whole when arranged as shown will be readily understood from an inspection of the drawing and from the foregoing description without further detailed description, it being obvious that the coupling device C will absorb the driving shock which occurs when the motor M is started to reverse the switch S and when the mechanism F reaches either end of its stroke after the switch has been reversed, as well as any shocks which may be caused by the switch being stalled by an obstruction in an intermediate position.

Under some conditions, it may not be desirable for manufacturing reasons to secure all of the discs 9, 10 and 11 together in the manner previously described, and when this is the case, these discs may be assembled in units each consisting of a rubber disc 11 disposed between and secured to two discs 9 and 10 in the manner shown in Fig. 8, as many units being provided in the coupling device as is necessary to transmit the desired torque. The operation of the coupling device when constructed in the manner shown in Fig. 8 is similar in all respects to the operation of a coupling device when it is constructed in the manner shown in Fig. 1.

Although I have herein shown and described only two forms of coupling devices embodying my invention, it is understood that various changes and modifications may be made therein within the scope of the appended claims without departing from the spirit and scope of my invention.

Having thus described my invention, what I claim is:

1. In combination, a drive shaft, a cylindrical housing journaled on said shaft, a longitudinal rib provided on the inside of said housing, a first disc keyed to said shaft within said housing, a second disc in said housing provided with a peripheral notch which receives said rib, a rubber disc disposed between said first and second discs and securely fastened thereto, and a member for transmitting power from said shaft to a load operatively connected with said housing.

2. In combination, a drive shaft, a housing journaled on said shaft, a first member keyed to said shaft and free to rotate with respect to said housing through a limited distance, a second member operatively connected with said housing in such manner that said housing is constrained to rotate in response to rotation of said second member, and a rubber member secured to said first and second members for yieldingly transmitting torque from the first member to the second member in response to rotation of the shaft.

WILLIAM C. McWHIRTER.